United States Patent [19]
Mosca

[11] Patent Number: 5,972,093
[45] Date of Patent: Oct. 26, 1999

[54] PAINT AND USE THEREOF

[75] Inventor: Roberto Mosca, Osimo, Italy

[73] Assignee: Bernacchia, Ida, Osimo, Italy

[21] Appl. No.: 09/051,003

[22] PCT Filed: Aug. 30, 1996

[86] PCT No.: PCT/IT96/00168
   § 371 Date: Mar. 30, 1998
   § 102(e) Date: Mar. 30, 1998

[87] PCT Pub. No.: WO97/12946
   PCT Pub. Date: Apr. 10, 1997

[30] Foreign Application Priority Data

Sep. 29, 1995 [IT] Italy ................................ BO95A0462

[51] Int. Cl.⁶ ............................ C09D 7/12; C09D 189/00
[52] U.S. Cl. ..................... 106/128.1; 106/134.1; 106/134.2; 106/145.1; 106/152.1; 106/157.2; 106/157.6; 106/157.7; 106/157.71; 106/157.8; 106/158.1

[58] Field of Search ............................ 106/128.1, 134.1, 106/134.2, 145.1, 152.1, 157.2, 157.7, 157.6, 157.71, 157.8, 158.1

[56] References Cited

U.S. PATENT DOCUMENTS 2,880,104   3/1959   Scholl ..................................... 106/128
5,312,481   5/1994   Greiner ................................... 106/157

*Primary Examiner*—David Brunsman
*Attorney, Agent, or Firm*—Dvorak & Orum

[57] ABSTRACT

The paint comprises in combination: pigments in a liquid solution chosen from the group of natural colouring earths; binders chosen from the group of milk, milk casein, egg white, egg yolk, starch paste and potato flour; compounds, mixed with said pigments and binders, chosen from the group of borax, kalinite, calcite, kaolin, slaked lime, mica and talc, sea salt and boron salts; and additives chosen from the group of vegetable oils, citrus-fruit juices, wine vinegar and natural waxes.

7 Claims, No Drawings

PAINT AND USE THEREOF

TECHNICAL FIELD

The present invention relates to a paint and use thereof In particular, the present invention relates to a wall paint, in the liquid or semi-liquid state, which can be used advantageously in the building sector for the decoration and/or restoration of masonry works to which the following description refers, without thereby losing its general character.

In the sector of activity relating to the preparation of paints it is known to use product formulations which essentially comprise three groups of main components referred to respectively as: pigments, fillers and binders; to which numerous other secondary components are added, such as wetting, dispersing and suspending agents, anti-blister agents, adjuvants, coalescents, bactericides, conservation agents, etc.

The most important of the groups of main components is without doubt the group of binders, which alone may determine the main characteristics of a certain paint.

BACKGROUND ART

In the currently produced paints, the binders consist of synthetic polymer resins with extremely long and complex molecules. The polymerisation time of a normal synthetic resin and hence of the film of paint is about 3 weeks. During this period, solvents, bactericides and surfactants which are extremely dangerous for human health and which, in particular in water-based paints—being odourless—manage to produce the most harmful effect, are released into the atmosphere. The gravity of this state of affairs is confirmed by modern medical science which is now universally in agreement in attributing to paints in general, and to drying agents in particular, many of the causes of serious pathological conditions. Of these, different types of tumour, acute allergies, asma, bone disorders, etc., are so recurrent among manufacturers and users of these paints that they are now regarded as professional illnesses true and proper within the sector.

Another disadvantage of these resins consists in the fact that the film formed after drying, although resistant and elastic, with time tends to deteriorate, showing signs of cracking, peeling and crumbling which ruin the aesthetic appearance, adversely affecting the supporting materials and producing dangerous dusts which are inhaled by the occupants of the environment.

The second group of components consists, as mentioned, of pigments. At present the pigments used are of the artificial inorganic type and consist of iron and zinc oxides, and titanium dioxides or organic pigments derived from oil.

All these substances have the disadvantage that they represent a source of environmental pollution.

The third group, finally, consists of fillers, the choice and dosing of which significantly influences the amalgam between binders and pigments, thus also making the paint more resistant, if carefully chosen and suitably dosed.

The most important components of the fillers currently used are natural substances such as (amorphous and crystalline) calcium carbonate, calcites, talcs, gypsum, sand, quarzites, etc. However, nowadays the tendency to use artificial fillers comprising powders which are coated, calcites, talcs, gypsum, sand, quarzites, etc. However, nowadays the tendency to use artificial fillers comprising powders which are coated, precipitated or have a completely synthetic structure is becoming increasingly widespread.

Finally, as regards the secondary components, in this case also, the tendency to use toxic synthetic chemical additives has now become widespread.

A paint composition of the type described in prior art portion of claim 1 (WPI Derwent 81-79092D[43] & SU-A-800154) is known in which the paint comprises in combination:

pigments in liquid solution chosen from the group of naturally colouring earth;

binders chosen from the group of milk, casein, starch paste and potato flour;

compounds, mixed with said pigments and binders, chosen from the group of borax, kalinite, calcite, kaolin, slaked lime, mica and talc, sea salt and boron salts;

additives chosen among groups of substances of natural origin.

With a paint of this kind considerable drawbacks are caused by using of drying oil. The casein implies an acid environment, this favours bacteria proliferation and chemical reaction with calcium carbonate, which further causes color alterations. Therefore, to avoid these problems the paint needs an high quantity of the drying oil is added.

If the quantity of the drying oil is instead low, and the paint is applied on walls with humidity, the humidity tends with time to deteriorate the film formed after paint drying, showing signs of cracking, peeling and crumbling. A percentage of boiled linseed oil (more than 2–3%) darkens the paint.

The drying oil is however obtained only with double boiling process with lead and/or other heavy metals, and by using also additives as naphthenes or similar compounds derived from oil cracking. All these materials used during the driving process are health dangerous and no compatible with ecological environment.

In accordance with the invention, these problems are resolved by means of a paint in which all the components, i.e. pigments, binders, fillers and additives, are chosen in combination with each other from substances and products which can be easily found in nature and are such as to cause a minimum impact on the ecosystem.

DISCLOSURE OF INVENTION

The technical characteristics of the invention in accordance with the aforementioned objects may be clearly derived from the contents of the claims indicated below and the advantages thereof will emerge more clearly in the detailed description which follows.

The paint according to the present invention consists essentially in a mixture of pigments chosen from the group of natural colouring earths, such as ochre, umber, etc., dissolved in a liquid or semi-liquid binder obtained with substances chosen from the group of milk, milk casein, egg white and egg yolk (combined or separate from one another) as well as starch paste or potato flour.

In view of the perishable nature of the natural binders used, in order to ensure their conservation in paint tins for at least a few months, prolonged experiments have been carried out on materials which could keep the pH (alkaline) value high so as to counteract the bacterial content and the formation of funghi and moulds both in the tinned paint and in the ready applied paint. Among the natural substances which have surprisingly proved more satisfactory, the best results have been obtained with sea salt, boron salts, lime and rice starch in varying combinations with one another. Moreover, the paint also includes mineral fillers and additives in powder form chosen from the group which comprises: aluminium and potassium sulphates (kalinite); salts composed of boric and potassium acid (borax); calcium and magnesium carbonates (calcite); aluminium hydrosilicates (kaolin); calcium hydroxide (slaked lime); silica and silicates (mica); magnesium silicate (talc).

Further added substances are chosen from the group of vegetable oils such as boiled linseed oil, citrus-fruit juices, in particular lemon juice, wine vinegar and wax of natural origin (bees' wax or wax of vegetable origin).

All the aforementioned component substances were mixed with one another in varying combinations and doses during more than one thousand trial mixtures in order to overcome simultaneously the following various problems: sedimentation, thickening, thinning, chalking, touching-up power, washability, abrasion resistance, weather-resistance in various external and internal environments, as well as resistance to the various temperatures and relative humidity.

The examples below explain the invention more clearly; however, they must be regarded as entirely indicative and non-limiting embodiments of possible formulations of the paint according to the invention.

EXAMPLE 1

Brush-on water-based paint for exteriors and interiors, comprising:

water in an amount by weight greater than 30%;

crystalline calcite, mica and egg yolk respectively contained in an amount of between 10 and 30%;

kaolin, egg white, slaked lime, boiled linseed oil and coloured earth respectively contained in an amount of between 1 and 10%;

kalinite, borax, lemon essence, potato flour, sea salt contained in an amount of less than 1%.

EXAMPLE 2

Smooth brush-on water-based paint for interiors, comprising:

milk in an amount by weight greater than 30%;

crystalline calcite and amorphous calcium carbonate contained in an amount of between 10 and 30%;

borax, egg white, boiled linseed oil, sea salt and talc respectively contained in an amount varying between 1 and 10%;

kalinite and scent contained in an amount of less than 1%.

EXAMPLE 3

Brush-on anti-mould water-based paint for exteriors and/or interiors comprising:

water in an amount by weight of between 10 and 30%;

borax, egg white, starch paste, milk, mica, egg yolk and colouring earths respectively contained in an amount of between 1 and 10%;

kalinite and boiled linseed oil respectively contained in amount of less than 1%.

EXAMPLE 4

Semi-liquid paint or stucco comprising:

water, crystalline calcite, egg white, starch paste, slaked lime respectively contained in an amount by weight of between 10 and 30%;

borax, milk, mica, egg yolk and colouring earth contained in percentages of between 1 and 10%;

kalinite, wax, linseed oil, Marseilles soap contained in an amount of less than 1%.

As regards the examples mentioned above it must also be pointed out that, in the formulations which use starch paste, the latter may be obtained by boiling for three minutes rice starch in powder form dissolved in water in the proportions 12.5:100.

As regards the egg white, the latter must be properly frothed and allowed to rest 12 hours before use: moreover it is important that the lime used should not be too strong.

As regards the egg yolk, it is advisable to de-grease it with lime and sea salt.

The milk must preferably be whole, because it is more greasy and adhesive, even though after application of the paint, it leaves some zones which are not entirely uniform, unlike skimmed milk.

From that stated above it is obvious how the paint described fully achieves the objects preset, with the further advantage that it allows one to obtain softer shades of colour compared to those which can be obtained with synthesis products. The use of the said paint, in addition to providing recently constructed buildings with a notable aesthetic effect, has also proved to be particularly advantageous in the restauration of old buildings which are of interest from an historic and monumental point of view.

As a result of the breathability characteristics of the paints according to the invention, the environmental hygiene remains practically unaltered over time, without producing harmful secondary effects associated with pellicular-type phenomena characteristic of synthesis products.

As also regards the economic aspect, it can be stated that the production costs of these paints may generally be considered to be in line with those of products obtained with chemical synthesis methods, making use of surplus milk which has nearly exceeded the expiry date for human consumption, in the storage depots, after monitoring of the PH value and bacteria content.

The invention thus conceived is subject to numerous modifications and variants, all of which fall within the scope of the inventive idea. Moreover, all the details may be replaced by technically equivalent elements.

In practice modifications and/or improvements are possible, provided that they fall within the scope of the following claims.

I claim:

1. Paint, characterized in that it comprises in combination:

pigments in liquid solution chosen from the group of natural colouring earths;

binders chosen from the group of milk, milk casein, egg white, egg yolk, starch paste and potato flour;

compounds, mixed with said pigments and binders, chosen from the group of borax, kalinite, calcite, kaolin, slaked lime, mica and talc, sea salt and boron salts;

additives chosen from the group of vegetable oils, citrus-fruit juices, wine vinegar and waxes of natural origin.

2. Paint according to claim 1, characterized in that the solvent of said liquid solution is water.

3. Paint according to claim 2, characterized in that it comprises water in an amount greater than 30% by weight; calcite, mica and egg yolk in a respective amount of between 10 and 30% by weight; kaolin, egg white, slaked lime, boiled linseed oil and coloured earth in a respective amount of between 1 and 10% by weight; kalinite, borax, lemon essence, potato flour and sea salt in a respective amount of less than 1% by weight.

4. Paint according to claim 2, characterized in that it comprises water in an amount, by weight, of between 10 and 30%; borax, egg white, starch paste, milk, mica, egg yolk and colouring earths in a respective amount of between 1 and 10% by weight; kalinite and boiled linseed oil in a respective amount of less than 1% by weight.

5. Paint according to claim 2, characterized in that it comprises water, calcite, egg white, starch paste and slaked lime contained in a respective amount of between 10 and 30% by weight; borax, milk, mica, egg yolk and colouring earth in a respective amount of between 1 and 10% by weight; kalinite, wax, linseed oil and Marseilles soap in an amount less than 1%.

6. Paint according to claim 1, characterized in that the solvent of said solution is milk.

7. Paint according to claim 6, characterized in that it comprises milk in an amount greater than 30% by weight; calcite and calcium carbonate contained in a respective amount of between 10 and 30% by weight; borax, egg white, linseed oil, salt and talc in a respective amount of between 1 and 10%; kalinite in an amount, by weight, less than 1%.

* * * * *